D. E. TEAL.

Tilting-Chair.

No. 6,309. Reissued Feb. 23, 1875.

Witnesses:

W. Lovell

H. C. Mattenberg.

Daniel E. Teal,

Inventor:

per

Atty

THE GRAPHIC CO. PHOTO-LITH. 39 & 41 PARK PLACE, N.Y.

UNITED STATES PATENT OFFICE.

DANIEL E. TEAL, OF NEW LISBON, NEW YORK, ASSIGNOR TO HEYWOOD BROTHERS & CO., OF GARDNER, MASSACHUSETTS.

IMPROVEMENT IN TILTING-CHAIRS.

Specification forming part of Letters Patent No. 38,428, dated May 5, 1863; reissue No. 5,054, dated September 10, 1872; reissue No. 6,309, dated February 23, 1875; application filed January 7, 1875.

*To all whom it may concern:*

Be it known that I, DANIEL E. TEAL, of New Lisbon, in the county of Otsego and State of New York, have invented a new and useful Improvement in Chairs; and I do hereby declare that the following is a full, clear, and exact description of the same, reference being had to the accompanying drawing and to the letters of reference marked thereon, making a part of this specification.

This invention pertains to the construction of a chair for ordinary use in an upright position, but adapted to the purpose of being tilted backward, when desired, without lifting its feet from the floor; and the invention consists in mounting the chair upon its support with one or more intermediate springs interposed between the under side of the seat and its support, so that its points of oscillation shall be in the rear of a line drawn transversely through the center of the seat, or so that the center of gravity shall fall sufficiently far behind the center of the seat to adapt the weight, when tilted, as nearly as may be to the reactive force of said intermediate spring or springs.

Figure 1:
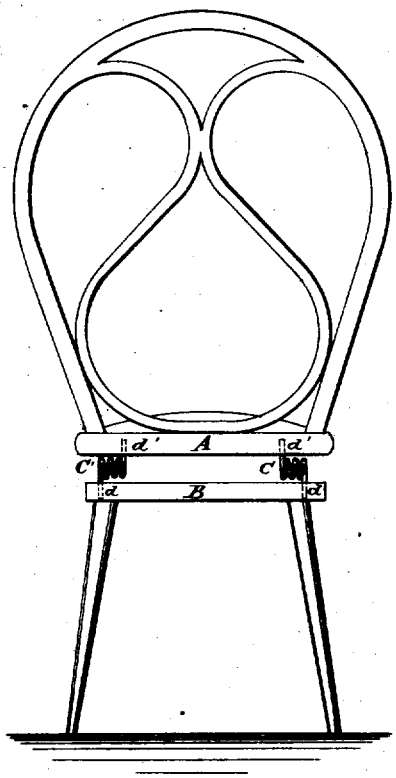
Figure 2:
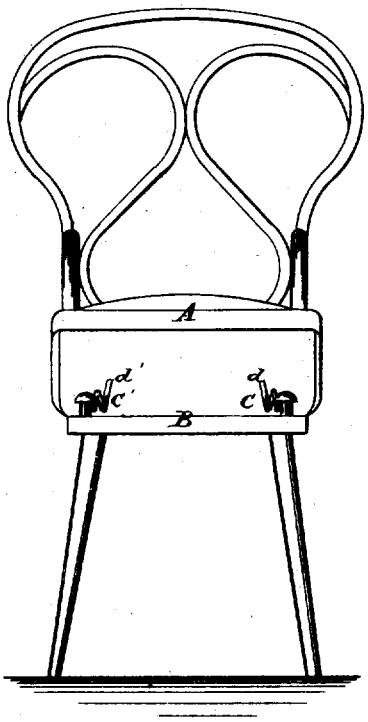
Figure 3:
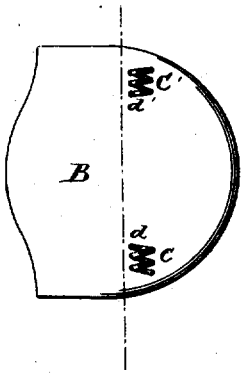

In the accompanying sheet of drawings, Figure 1 is a rear view of a chair in its upright position. Fig. 2 is a front view of a chair when tilted back; and Fig. 3 is a plan of the seat, showing the position of the springs, which are coincident with the points of oscillation.

Like characters denote corresponding parts in the several figures.

At A is represented the chair proper, and differing in no essential particular from ordinary chairs. At B are represented the supporting-frame and legs, of any suitable form and construction. At C C′ are coiled springs, each having its point of attachment to the frame B and seat A at *d d′*, in the rear of a line drawn transversely across the center of the seat of the chair, or in such position that the center of gravity will be wholly in the rear of said line when the chair is in a tilted position.

Having thus described my invention, what I claim as new, and desire to secure by Letters Patent, is—

A tilting chair with one or more springs placed intermediately between the under side of the seat and its support, having their points of oscillation in the rear of a line drawn transversely through the center of the seat.

D. E. TEAL.

Witnesses:
H. L. WATTENBERG,
G. M. PLYMPTON.